(12) United States Patent
Raiyat

(10) Patent No.: US 6,665,017 B1
(45) Date of Patent: Dec. 16, 2003

(54) TELEVISION RECEIVER RECEIVING A PLURALITY OF CHANNELS CARRYING A DATA SIGNAL REPRESENTING PAGES OF INFORMATION

(75) Inventor: Farzad Raiyat, Eastleigh (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/454,343

(22) Filed: Dec. 3, 1999

(30) Foreign Application Priority Data

Dec. 5, 1998 (GB) ............................................. 9826697

(51) Int. Cl.$^7$ ............................ H04N 7/00; H04N 7/08; H04N 7/087; H04N 11/00
(52) U.S. Cl. ...................... 348/468; 348/461; 348/467; 348/465; 348/564; 348/563
(58) Field of Search ................................. 348/468, 465, 348/461, 467, 473, 563, 564, 714; 725/137

(56) References Cited

U.S. PATENT DOCUMENTS

| | | | | |
|---|---|---|---|---|
| 4,388,645 A | * | 6/1983 | Cox et al. .................... | 348/467 |
| 4,393,404 A | * | 7/1983 | Cox et al. .................... | 348/467 |
| 4,394,687 A | * | 7/1983 | Hutt et al. ................... | 348/467 |
| 4,814,756 A | * | 3/1989 | Chauvel ...................... | 345/565 |
| 5,181,113 A | * | 1/1993 | Chang ........................ | 348/468 |
| 5,208,671 A | * | 5/1993 | Tarrant ....................... | 348/465 |
| 5,237,411 A | * | 8/1993 | Fink et al. ................... | 348/468 |
| 5,353,064 A | * | 10/1994 | Schlink ...................... | 348/468 |
| 5,386,238 A | * | 1/1995 | Kinghorn et al. ........... | 348/468 |
| 5,610,664 A | * | 3/1997 | Bobert ....................... | 348/564 |
| 5,635,987 A | * | 6/1997 | Park et al. ................... | 348/468 |
| 5,757,414 A | * | 5/1998 | Thorne ....................... | 725/139 |
| 5,905,537 A | * | 5/1999 | Van Gestel ................. | 348/468 |
| 5,910,821 A | * | 6/1999 | Gyarmati .................... | 348/468 |
| 6,064,439 A | * | 5/2000 | Kimura et al. .............. | 348/468 |
| 6,239,844 B1 | * | 5/2001 | Raiyat ........................ | 348/468 |
| 6,400,408 B1 | * | 6/2002 | Berger ........................ | 348/465 |
| 6,412,111 B1 | * | 6/2002 | Cato .......................... | 725/137 |
| 6,493,037 B1 | * | 12/2002 | Raiyat ........................ | 348/564 |

FOREIGN PATENT DOCUMENTS

| | | | | |
|---|---|---|---|---|
| EP | 0536828a1 | | 4/1993 | |
| EP | 000540885 A1 | * | 5/1993 | .......... H04N/7/087 |
| EP | 0624980 A1 | | 11/1994 | .......... H04N/7/087 |

* cited by examiner

*Primary Examiner*—Michael H. Lee
*Assistant Examiner*—Paulos Natnael
(74) *Attorney, Agent, or Firm*—Edward W. Goodman

(57) ABSTRACT

A television receiver for receiving data, such as teletext, multiplexed with the television signal, includes a data acquisition circuit (6) for acquiring at least selected pages of the data signal and a memory (13) for storing a plurality of pages. A non-volatile memory (11) holds a Favorite Pages List for the user for each of a plurality of channels, and a microprocessor (7) causes the receiver to tune to each channel, in turn, to acquire and store in the memory (13) the favorite pages for all of the channels. The microprocessor (7) causes the receiver to tune to each of the channels in turn on switch-on and acquires the favorite pages for that channel. The receiver is tuned to each channel, in turn, for a period long enough to acquire the favorite pages either by allowing a set time or by monitoring the receipt of the favorite pages. Alternatively, a second tuner is used to scan the non-viewed channels.

7 Claims, 2 Drawing Sheets

TELEVISION RECEIVER RECEIVING A PLURALITY OF CHANNELS CARRYING A DATA SIGNAL REPRESENTING PAGES OF INFORMATION

BACKGROUND OF THE INVENTION

1. Field of the Invention

The invention relates to a television receiver for receiving a plurality of television channels, at least some of said television channels carrying a data signal representing pages of information to be displayed, said data signal being multiplexed with the television program transmitted in said channel.

2. Description of the Related Art

The transmission of data multiplexed with a television signal is well known. An example is the teletext standard in which data representing pages of information to be displayed, is sent in the vertical blanking interval of a standard analog television picture signal. In addition, with the introduction of MPEG-encoded digital television transmissions, there is provision for data signals to be multiplexed in the digital data streams. The data represents pages of information, and, in this context, a page refers to a quantity of data which is displayed at one time on a television display. Thus, normally, one page will be displayed at a time, although it is possible to have a split screen and display a number of pages simultaneously.

It has been found that typical viewers will select a small sub-set of the pages which are transmitted as being of interest to them and will access these pages much more frequently than others. As a result, television receivers have been produced which store the numbers of those pages which the user habitually accesses. When the receiver is switched on, it is arranged to automatically search for those particular pages in the transmission cycle of the data associated with the channel which is selected for viewing, so that they are acquired and stored in memory. Thus, when the viewer wants to access these favorite pages, they are already stored in memory so that it is not necessary to wait for them to occur in the transmission cycle. One of the major criticisms of the teletext system is the time required to access a particular selected page. This depends on when, in the cycle of transmission, a page is requested. The delay can be particularly significant when sub-pages or revolving pages are used, particularly if there are a large number of them.

SUMMARY OF THE INVENTION

It is an object of the invention to enable the speed of acquisition of the favorite pages of a viewer to be increased.

The invention provides a television receiver for receiving a plurality of television channels, at least some of said television channels carrying a data signal representing pages of information to be displayed, said data signal being multiplexed with the television program transmitted in said channel, said receiver comprising means for selecting each of the received channels, means for storing addresses of favorite pages of data associated with at least some of said channels, means for causing the receiver to automatically select each of the channels having associated therewith stored addresses of favorite pages in turn, to acquire the data representing the favorite pages for each channel, and to store the data, and means for selecting one or more of the stored favorite pages.

With prior art television receivers, the favorite pages which are stored are those which are associated with the channel which is currently being received. There is no means of acquiring the favorite pages associated with other television channels as only those data signals associated with the channel being viewed are presented to the acquisition circuits. Consequently, when the viewer changes channels there is a delay before the favorite pages associated with the new channel are acquired. At the same time, the favorite pages associated with the channel which was previously being watched are lost.

A television receiver in accordance with the present invention acquires and stores the data representing the favorite pages for each channel. These pages are stored in a dedicated portion of memory which is allocated for favorite pages of each of the channels. Thus, on changing channels, the data is not overwritten by new data received from teletext or other data transmissions associated with the newly received channel.

The television receiver may comprise means for causing the receiver to scan all the channels having associated therewith favorite pages to acquire and store the favorite pages each time the receiver is switched on.

By this means, the capture of the favorite pages for each channel is ensured in the fastest possible time and, frequently, the viewer will not be particularly interested in the program being transmitted when the receiver is first switched on. Thus, the viewer will not object to not being able to watch a program on a particular channel during the time taken to scan the channels and enter the favorite pages into the memory.

Alternatively, or in addition, the television receiver may comprise user operated means for instructing the receiver to scan those channels having associated favorite pages to acquire and store said favorite pages at a time determined by the user.

By enabling the user to initiate the scanning of the channels, this operation can be carried out at a time convenient to the user. For example, if the user switches on the television receiver at a time when the program being broadcast is one which is of interest to the viewer, then the interruption of the program caused by the scanning of the various channels could be annoying. If, however, the user is provided with means to choose the time at which the scanning takes place, this can be done at a time when the program being broadcast is not of interest. The receiver may be arranged, in a default state, to scan all the channels when it is switched on, but there may be an override instruction operable by the user to prevent the scanning from occurring if the user is interested in a particular program being transmitted at that time. Thus, for example, two buttons may be provided on a remote control unit, one of which is used to disable the automatic scanning when the receiver is switched on, and the other of which is used to initiate scanning at a time convenient for the user. Alternatively, a single button could be used whose function is to change the mode from scanning to non-scanning and vice versa. This is similar to the arrangement on many current remote control units for switching between text and picture where the same button is used to change in both directions.

The television receiver may comprise means for causing the receiver to select each of the channels for a period at least as long as the cycle time of the transmitted data.

Teletext data is transmitted in serial form, one page succeeding another. Consequently, it takes a finite time for any given page to appear in the transmission cycle. The transmission of teletext data is such that the pages reappear at regular intervals dependent on the number of pages which are being transmitted by the broadcaster. This cycle time is normally of the order of 30 seconds, that is, any given page will reappear in the transmission at approximately 30 second intervals. Thus, if the receiver selects each of the channels for a period somewhat in excess of that 30 seconds, the favorite pages should all be acquired during that time.

In an alternative embodiment, the television receiver comprises detection means for detecting when all of the favorite pages associated with the selected channel have been acquired and stored, and means for selecting the next channel in response to the output of the detection means.

This will ensure that all of the favorite pages are actually acquired and stored before the receiver moves on to the next channel. This has the advantage that if, for example, interference causes one of the favorite pages to be corrupted and, hence, not be acquired, then the receiver will stay tuned to the selected channel until the page is re-transmitted. In addition, this will enable rolling pages to be captured, if, for example, one of the favorite pages has a number of rolling pages associated, then the total cycle time will be increased, but by moving on to the next channel only when it has been detected that all the pages in the favorite pages list have been acquired, it is possible to ensure that all the pages that the viewer wishes to have stored have been stored during this scanning process.

The television receiver may comprise means for detecting which pages of data are currently being transmitted, and said detection means may be arranged to detect when all transmitted favorite pages have been acquired and stored.

Broadcasters do not always transmit every page of each magazine of teletext data. This will depend on whether the particular topic for that page currently has any information. An example is that those pages which relate to results from an event shortly to take place may not be transmitted until either the event starts or a final result is available. In the version of teletext known as TOP, a special page known as Table Of Pages is transmitted which lists all the pages which are currently in the transmission cycle. By comparing this list with the favorite page numbers, it can be established which favorite pages are currently being transmitted, and, in this case, the detection means is arranged to produce an output indicating the acquisition and storage of the favorite pages once all the currently transmitted favorite pages have been acquired and stored. For teletext transmissions of other standards where a list of the pages currently in the transmission cycle is not transmitted, teletext decoders are known which monitor the transmission to determine which pages are currently be transmitted, and keep a list of such pages. This list can be used in conjunction with the List of Favorite Pages to determine when all the favorite pages currently being transmitted have been acquired and stored.

An alternative to this arrangement which will prevent the scanning from being locked onto a particular channel if not all the favorite pages are being transmitted, is to combine the detection means with an overall time limit so that if all the favorite pages are not acquired after a time which corresponds to a plurality of transmission cycles, it is assumed that those pages not acquired are not being currently transmitted. The actual number of transmission cycles to which the time limit corresponds should be chosen to be as few as possible consistent with ensuring that those favorite pages which are being transmitted will be acquired and stored. This number will also depend on whether it is desired to capture any sub-pages associated with the favorite pages, and the number of such sub-pages which can be catered for.

The television receiver may further comprise means for selecting, for display, favorite pages associated with channels other than that to which the receiver is currently tuned, for reception.

It may be that a viewer would like to access teletext or other data pages which are not associated with the particular program currently being watched. Thus, for example, a viewer may wish to view the teletext pages relating to a particular news item or sports item on a different channel from the one which is currently being displayed. In order to do that, in prior art receivers, the viewer had to change channels and wait for the teletext pages to be acquired, and was unable to continue watching the program transmitted on the original channel. It will be realized, of course, that, standard television receivers which are equipped for receiving teletext and other data, normally have a display mode called "mixed mode" where the text is superimposed on the picture. Thus, the viewer can continue viewing the program while reading teletext text which is associated with either the current channel or with other channels. Thus, by providing storage where the teletext pages are stored in dedicated locations for each channel, these pages may be accessed regardless of whether that channel is currently being received. It will be apparent, of course, that any teletext data which is stored and which is associated with channels other than that being currently received will not be updated. In most cases, however, this is not of great significance as the teletext data transmitted by the broadcaster is not normally frequently updated, although there are particular pages where relatively continuous updating does occur. Since many of the pages are only updated daily, or perhaps two or three times a day, the fact that the teletext data associated with other channels are not being updated is not a major disadvantage.

On completion of the acquisition of the favorite pages, the television receiver may revert to selecting the previously received channel. Thus, on switch on, it may be arranged that after the channels have been scanned and the favorite pages acquired, the television receiver selects the channel that was being viewed immediately before it was last switched off. In the alternative situation, where the viewer is instructing the receiver to scan the channels, then the receiver, after it has acquired the favorite pages, will revert to selecting the channel which was being viewed at the time the viewer requested the acquisition of the favorite pages.

The invention further provides a television receiver as set forth above having two channel selectors, wherein the first channel selector is arranged to select a channel for viewing and/or acquisition of the data signal associated with that channel, and the second channel selector is arranged to select, in turn, each channel for which favorite pages of data exist, and to acquire those favorite pages being transmitted in each of those channels.

By using one channel selector (or tuner) for selecting the channel for viewing and a further channel selector (or tuner) for scanning the other channels to acquire the favorite pages of data, the disadvantage that when the channel scanning is initiated at the time of switch on this may prevent a viewer from watching a program which is being transmitted on one channel, is overcome, since there is no requirement that the acquisition of the data signal should cause the channel being viewed to change. In this embodiment, the acquisition of the favorite pages of data takes place in the background and is transparent to the viewer who merely sees the result of obtaining the favorite pages for the other channels by having faster access to the favorite pages of the other channels when called up using a remote control unit, but is not aware of the receiver undertaking the process.

The television receiver may comprise means for causing the second channel selector to continuously cycle round those channels having favorite pages of data associated with them to enable the data stored to be updated.

While much of the teletext data which is transmitted by broadcasters is not updated frequently, some pages are frequently updated. An example is a page containing current scores in sports matches. These pages are not necessarily transmitted with all channels, and if a viewer wishes to have this updating while watching a channel that does not have such data associated with it, then the continuous cycling of the second channel selector enables those pages to be updated, even though a program on a different channel is being viewed.

The television receiver may comprise means for preventing the second channel selector from selecting the channel which is presently selected by the first channel selector. If the receiver includes two data acquisition channels, then the first channel selector may feed its output to the first data acquisition channel while the second channel selector feeds its output to a second data acquisition circuit. In this way, the channel which is currently being viewed may have its data pages constantly updated without having to wait for the channel selector to scan round to that particular channel. This is of increasing importance as the number of channels increase, since with typical cycle times, it will take approximately thirty seconds to scan each channel and with ten channels, this would mean that the pages could be updated only once every five minutes.

The television receiver may comprise means for causing the second selector to stop cycling round those channels having favorite pages of data associated with them.

Television receivers are known which have more than one channel selector or tuner. The second channel selector may be used to select a channel for display as a Picture-In-Picture (PIP) or for selecting a channel for recording; particularly, when the television receiver is combined with a video recorder. In these circumstances, the second channel selector may be used not only for displaying a PIP or for selecting a channel for recording, but while the PIP or recording function is not selected, may also be used as the second selector which cycles round the other channels having favorite pages associated with them. Consequently, in this case, no additional channel selector or tuner is required. The control means is merely required to cause the output of the second channel selector to be directed to the PIP display, to the recorder, or to the data store.

The present invention relates to television receivers for receiving both analog television signals having a teletext transmission associated therewith, and digital television data streams which have multiplexed therewith a data signal representing pages of information in a manner similar to the teletext data in analog television. Thus, the channel selector may be a standard television tuner for analog television signals or may be a demultiplexer for selecting one of the channels from a digital data stream containing a number of channels. In addition, where a number of separate digital multiplexes are transmitted, the channel selector may comprise a combination of tuner and demultiplexer circuits.

BRIEF DESCRIPTION OF THE DRAWINGS

The above and other features and advantages of the invention will be apparent from the following description, by way of example, of an embodiment of the invention with reference to the accompanying drawings, in which.

DESCRIPTION OF THE PREFERRED EMBODIMENTS

Figure 1:
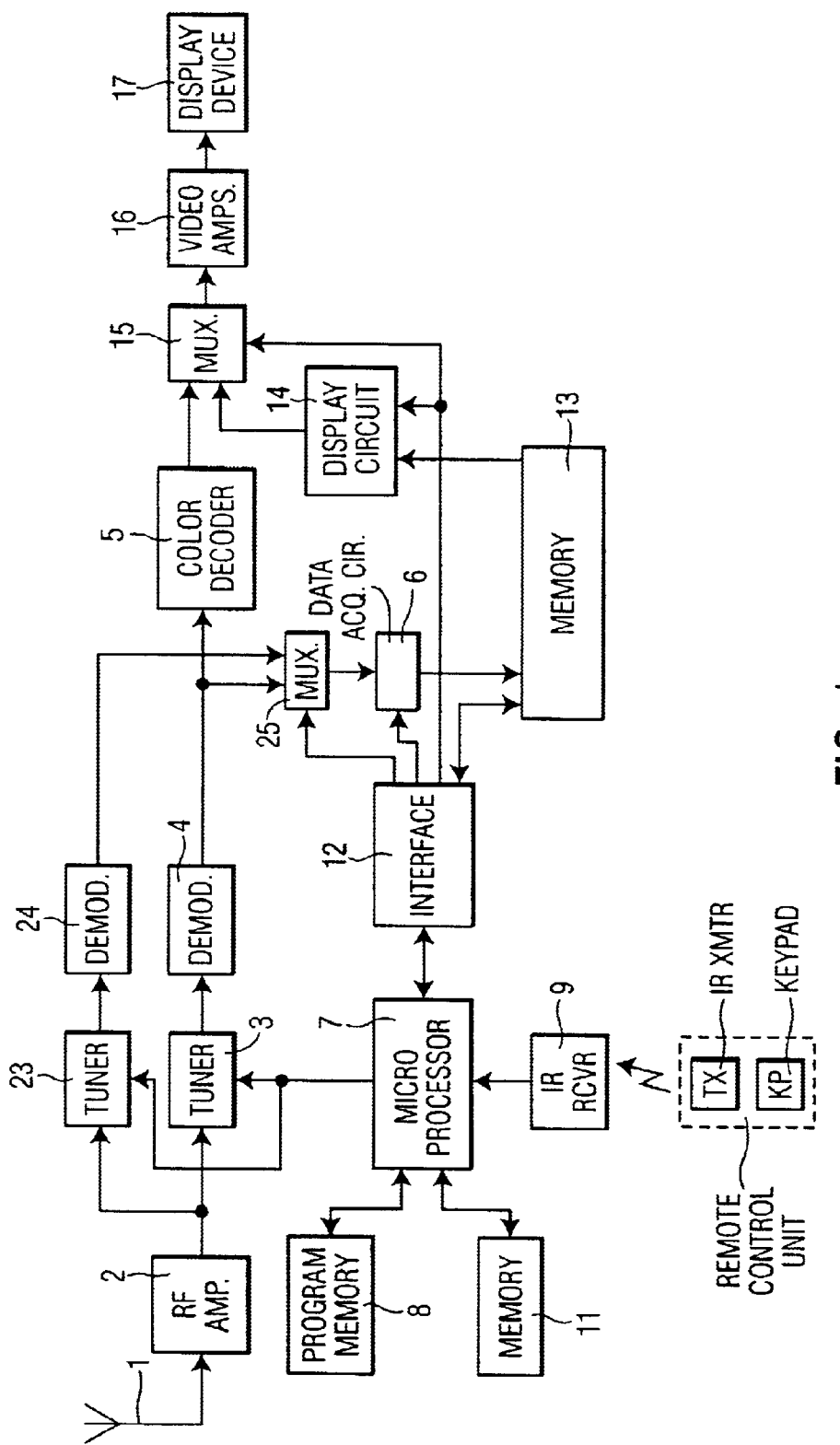
FIG. 1 shows, in block schematic form, a television receiver according to the invention.
Figure 2:
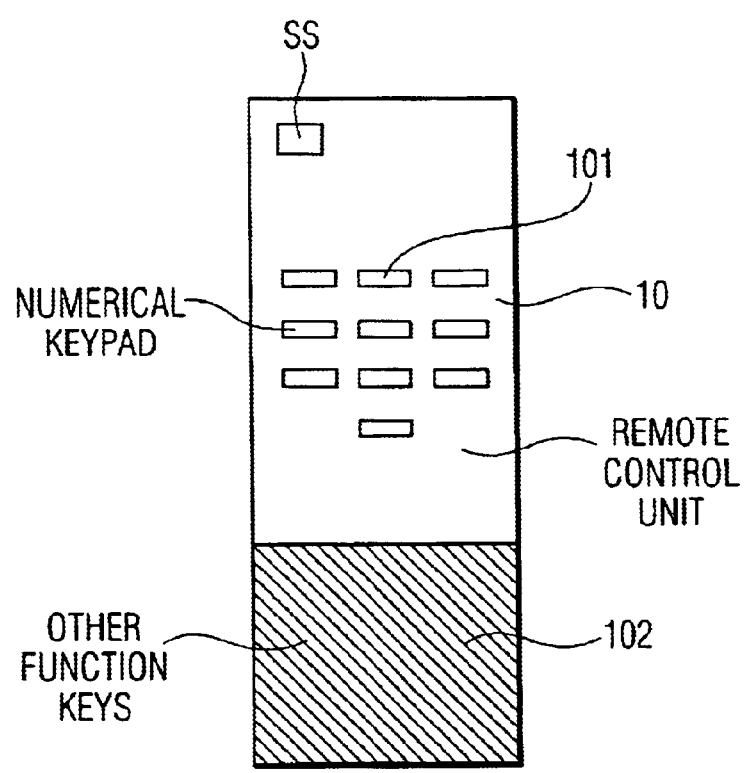
FIG. 2 shows a remote control unit for entering commands into the television receiver shown in FIG. 1.

As shown in FIG. 1, the television receiver comprises an aerial 1 which is connected to the usual RF amplifying circuit 2. The output of the RF amplifying circuit is fed to a tuning circuit 3 which selects the channel to be received. The output of the tuning circuit 3 is fed to a demodulation circuit (demodulator) 4 having an output for providing a combined video and blanking signal. The combined video and blanking signal is fed to a color decoder 5 and to a data acquisition circuit 6 which is arranged to acquire the data multiplexed with the television signal. A microprocessor 7 having a program memory 8 receives input signals from an infra-red receiver 9. These input signals are instructions from a user, using a remote control unit 10 which comprises a keypad KP and an infrared transmitter TX, to transmit appropriately coded instructions through the receiver 9 to the microprocessor 7. These instructions to the microprocessor 7 will include the usual functions of switching the receiver from stand-by to a particular channel, selecting whether a television picture or text should be displayed, and determining which data pages should be acquired for display. Thus, typically, as shown in FIG. 2, the remote control unit 10 will comprise a numerical keypad 101 and a number of other function keys in the shaded area 102 which relate to the selection for display of picture, text, or mixed mode, and many other features which may be provided on a television receiver and/or video recorder. The microprocessor 7 also has an associated non-volatile memory 11, in which data can be entered which gives, for example, the information needed to be passed from the microprocessor 7 to the tuning circuits 3 to select each of the channels. The data in the non-volatile memory 11 will be entered at the time the television set is set up for initial use. The memory 11 may also include details of the favorite pages of the data associated with given channels for a particular user. This information may be entered by the user using the keypad KP on the remote control unit 10, or may be derived and/or updated by monitoring which pages the user habitually requests. The microprocessor 7 is connected through an interface circuit 12 to the data acquisition circuit 6 and to a memory 13 which stores the data for each page of the data signal which is acquired by the data acquisition circuit 6. In this way, the microprocessor 7 controls which pages of data are acquired and whether and at what locations in the memory 13 they are stored. In some circumstances, the data acquisition circuit 6 may be arranged to acquire all data transmitted and enter it into a FIFO (first in first out) memory from which the microprocessor 7 transfers the desired pages to store in the memory 13. The microprocessor 7 further communicates, via the interface circuit 12, with a display circuit 14 which takes the data from the memory 13 and formats it for display on the screen of the television receiver.

The outputs of the color decoder 5 and display circuit 14 are fed to inputs of a multiplexer 15, which is arranged to select either the video or the text information for display, or to select a mixture of the two. The microprocessor 7 controls the operation of the multiplexer 15 via the interface circuit 12. The output of the multiplexer 15 is fed via video amplifiers 16 to a display device 17.

Most current television receivers contain a microcontroller such as the microprocessor 7 in FIG. 1. This microcontroller receives instructions from the user via the remote control unit 10, which contains a number of buttons for calling up appropriate control functions. Thus, the remote control unit normally has means for selecting a particular channel which the viewer wishes the receiver to select. This may be in the form of a numerical keypad which selects channel numbers. The microprocessor 7, in response to the channel number entered via the remote control unit 10, applies appropriate signals to the tuner 3 to cause it to select that particular channel. The signals produced by the microprocessor 7 are dependent on values stored in the non-volatile memory 11. Conventionally, when the television receiver is first installed, the microprocessor 7 causes the tuner to search through the waveband of the expected signals and when a signal is detected, it pauses at that particular setting and the user then enters the channel number that he wishes to allocate to that particular channel. This information is stored in the non-volatile memory so that the viewer can select a particular channel to be watched merely by entering the channel number on the remote control unit. In addition, it is known to store the page numbers of a plurality of pages of teletext associated with each channel. These page numbers are those which are most frequently accessed by the viewer. The page numbers stored in the non-volatile memory 11 may be entered by the viewer during a set-up procedure by using the numerical keypad on the remote control unit to enter the page numbers, or may be generated by the microprocessor 7 after monitoring which pages are habitually requested by the viewer.

Conventionally, when a channel is selected, the microprocessor 7 instructs the data acquisition circuit 6 to acquire the favorite pages associated with that channel. The data acquired is then stored in the memory 13. When the viewer subsequently selects the text display function, the pages the viewer habitually accesses will have been already stored in the memory 13 and the viewer will then not have to wait until the particular page comes round in the transmission cycle. This, of course, assumes that the viewer has been watching the video signal for sufficiently long that the favorite pages have been acquired. If the viewer immediately switches to the teletext display function, then, of course, the delay in accessing those pages will still occur. When the teletext display function is requested, the microprocessor 7 causes the data stored at selected locations in the memory 13 to be fed to the display circuit 14 for conversion into the display format, and causes the multiplexer 15 to select the output of the display circuits 14 rather than the output of the color decoder 5. It is, of course, known to use the mix mode for displaying teletext characters superimposed on the video signal, and, in this case, the multiplexer switches between the display circuit output 14 and the color decoder output 5 in order to mix the two signals.

Thus far, the television receiver as shown in FIG. 1 is conventional, and there are currently on the market television receivers which will perform these functions. Current television receivers, however, suffer from the disadvantage that when the viewer changes channels, it may be necessary to wait for at least one cycle of the teletext data before the favorite pages are available.

The present invention allows for all channels which have associated data to be scanned, and the favorite pages associated with each channel to be allocated dedicated areas of the memory 13 so that the favorite pages for all the channels can be held in the memory 13.

There are number of possible procedures for acquiring and storing the favorite data pages in the memory 13. A first arrangement is that on switch-on of the receiver, the microprocessor 7 causes the tuning circuit 3 first to select a first channel and acquire the favorite pages associated with that channel. When those pages have been acquired, the microprocessor 7 causes the tuning circuit 3 to select the next channel, and this procedure is repeated until all the relevant channels have been scanned. In this way, a plurality of sets of locations in the memory 13 can be filled with the favorite pages for each of the channels. The microprocessor 7 may be programmed so that the tuner selects each channel for a fixed period which is greater than the cycle time of the data being transmitted. The normal cycle time of teletext data is around 30 seconds. Consequently, under these circumstances, the data associated with ten different channels could be acquired in about 5 minutes. If, however, the viewer wishes to view a particular program immediately after switching on the receiver, the remote control unit includes means for enabling a command to be sent to the microprocessor 7 which will inhibit the scanning of all the channels. The viewer will, of course, then be aware that the favorite pages for other channels will not be available immediately on switching to another channel. In many instances, however, the television receiver will be switched on some period of time before the program which the viewer wishes to view starts, and, in this case, the scanning of the other channels to acquire the favorite pages will not prove an inconvenience.

The remote control unit is provided with a button SS which the user can operate to cause the television receiver to scan through all the channels and acquire the favorite page for each channel. Thus, if the viewer wishes to update the information in the favorite pages memory, then operation of the SS button on the remote control unit 10 will pass an instruction to the microprocessor 7 to cause the tuner 3 to scan through all the channels until it has acquired all the favorite pages associated with those channels. In this way, the viewer has freedom to either initially acquire or update the favorite pages for all the channels at a time when no television program of interest is being broadcast. The viewer may also choose to initiate this procedure when actually viewing the favorite pages of a particular channel, as these pages will be stored in the memory 13 and will be accessible therefrom without needing the tuning circuits to be tuned to that particular channel. The microprocessor 7 may further be programmed so that if the button SS is operated while scanning of channels is taking place, it will cause the scanning to cease. As a result, if a program of interest to the viewer starts, the scanning can be discontinued. Thus, only a single push button is required both to initiate and discontinue the scanning, the microprocessor 7 interpreting the required function according to the present state of operation of the receiver, i.e., if the receiver is currently scanning all channels then operating the pushbutton will cause the receiver to cease scanning, and vice versa.

Since favorite pages are stored in the memory 13 in blocks which are associated with each channel, it is possible to view the text pages on one channel while the tuner is tuned to a different channel. Assuming that the pages in the Favorite Pages List are not updated frequently by the broadcaster, it is unimportant that the recurring transmission cycles of those text pages are not being received.

As shown in FIG. 1, the television receiver may comprise a second tuner 23 which feeds a second demodulator 24 whose output is coupled to an input of a multiplexer 25. When these components are added, the output of the demodulator 4 is further coupled to a second input of the multiplexer 25 and the output of the multiplexer 25 is connected to the data acquisition circuit 6. The multiplexer 25 is controlled by the microprocessor 7 through the interface circuit 12. In this arrangement, the second tuner 23 and demodulator 24 may be arranged to scan through the available channels to continuously acquire and update the favorite pages associated with that channel. Thus, the viewer can view a particular program which is selected by the tuner 3 and, at the same time, the receiver is continuously updating the favorite pages for all the channels. In this way, the acquisition of the favorite pages is transparent to the viewer, as it is carried out in the background by the receiver under the control of the microprocessor 7 using the additional tuning and demodulation circuits.

The microprocessor 7 may be programmed so that the tuner 23 continuously scans through all channels. Alternatively, it may be arranged that the tuner 23 scans through all channels apart from that to which the tuner 3 is tuned. This second option is particularly useful when more than one data acquisition circuit is provided.

In these circumstances, one of the data acquisition circuits can be reserved for acquiring data from the channel to which the receiver is tuned using the timer 3. This means that the favorite pages for the channel selected by the viewer to view are updated continuously rather than only when the tuner 23 is tuned to that particular channel. This has the advantage that the user is more likely to require up-to-date teletext information from the channel to which the receiver is currently tuned.

The additional tuner 23 and demodulation circuit 24 may be already present in a television receiver including functions such as Picture-In-Picture (PIP). Another circumstance in which a second tuner may be present is in a combined television receiver and video recorder, the second tuner enabling a video recording to be made of the program transmitted in one channel while the receiver is tuned to a second channel. In such receivers, when neither recording nor the PIP function is being used, the tuner 23 may be used to scan the available channels so that the associated favorite pages may be acquired and updated for entry into the memory 13. In this case, the additional hardware required for implementation of this function is minimized.

The microprocessor 7 may be programmed so that it is possible to access the favorite pages from one channel while viewing another channel. These favorite pages may be displayed in mixed mode so that they are superimposed on the picture. This would enable the viewer to read the text information while still continuing to view a program. Alternatively, in text mode, the viewer would still be able to follow the dialogue on the program received via the tuner 3.

A receiver in which the microprocessor is programmed as described in the preceding paragraph, has the advantage that a user could cycle through the favorite pages associated with each of the channels received in turn. Thus, for example, if a particular topic of news has broken, the user would be able to look at the slant given to that piece of news by the program or text editor of each channel by successively accessing the favorite pages in each block of the memory 13. It is likely that a viewer's Favorite Pages List for each channel will cover the same topic of interest. Thus, the sports enthusiast may have several pages of sports news in the Favorite Pages List, while a music enthusiast may have several music related pages in the Favorite Pages List of each channel.

While the foregoing description with reference to FIGS. 1 and 2 has given, as an example, a receiver for analog television signals, the invention is equally applicable to receivers for receiving digital television signals. In this case, data representing text and or graphics is sent multiplexed with the digital television signal rather than as a teletext-coded data signal which is sent with the analog television signal. As the digital television signals may be one of a plurality of time-division-multiplexed data streams, the tuner could be replaced by a demultiplexer which selects a particular data stream under the control of the microprocessor 7. As is known, the present proposals for digital television signals envisage a number of digital channels, each of which contains a plurality of multiplexed data streams. In that case both, a tuner and demultiplexer are required in order to select one of the digital television channels. Thus, the term "means for selecting each of the received channels" is intended to cover both an analog tuner as described in FIG. 1 and a demultiplexing circuit where a digital television data stream is to be selected from a number of multiplexed digital data streams, and to a combination of tuning and demultiplexing circuits where a number of multiplexed digital television data streams are transmitted at different frequencies.

By providing a memory 13 which has sufficient capacity to store a number of pages of data associated with each channel which can be received, it is possible to acquire the favorite pages for each received channel and to store them in the memory 13 so that they are instantly displayable on the display when requested by the viewer. By causing the receiver to automatically cycle through each of the channels and acquire the favorite pages for each of those channels, the contents of the memory can be updated. In particular, if two tuners are provided, the updating of the favorite pages in the memory can be carried out continuously. Because the favorite pages associated with each channel are stored in the memory 13, almost instant access to any of the favorite pages is available regardless of the channel the viewer is currently watching, since it is no longer necessary, for the favorite pages, for the data to be re-acquired each time a channel change is effected.

From reading the present disclosure, other modifications will be apparent to persons skilled in the art. Such modifications may involve other features which are already known in the design and use of television receivers and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization of one or more of those features which would be obvious to persons skilled in the art, whether or not it relates to the same invention as presently claimed in any claim, and whether or not it mitigates any or all of the same technical problems as does the present invention. Applicants hereby give notice that new claims may be formulated to such features and/or combinations of such features during the prosecution of the present application or of any further application derived therefrom.

What is claimed is:

1. A television receiver for receiving a plurality of television channels, at least some of said television channels carrying a data signal representing pages of information to be displayed, said data signal being multiplexed with a television program transmitted in said channel, said television receiver comprising:

means for selecting each of the received channels;

means for storing addresses of favorite pages of data associated with at least some of said channels;

means for causing the receiver to automatically select, in turn, each of the channels having associated therewith stored addresses of favorite pages for acquiring the data representing the favorite pages for each channel, and for storing the data; and means for selecting one or more of the stored favorite pages, wherein said television receiver further comprises:

means for selecting, for display, favorite pages associated with channels other than that to which the receiver is currently tuned for reception.

2. A television receiver for receiving a plurality of television channels, at least some of said television channels carrying a data signal representing pages of information to be displayed, said data signal being multiplexed with a television program transmitted in said channel, said television receiver comprising:

means for selecting each of the received channels;

means for storing addresses of favorite pages of data associated with at least some of said channels;

means for causing the receiver to automatically select, in turn, each of the channels having associated therewith stored addresses of favorite pages for acquiring the data representing the favorite pages for each channel, and for storing the data; and means for selecting one or more of the stored favorite pages, wherein the television receiver further comprises two channel selectors, the first channel selector selecting a channel for viewing and or/acquisition of the data signal associated with that channel, and the second channel selector selecting, in turn, each channel for which favorite pages of data exist and acquiring those favorite pages being transmitted in each of those channels.

3. The television receiver as claimed in claim 2, wherein said television receiver further comprises:

means for causing the second channel selector to continuously cycle round those channels having favorite pages of data associated with them to enable the data stored to be updated.

4. The television receiver as claimed in claim 3, wherein said television receiver further comprises:

means for preventing the second channel selector from selecting the channel which is presently selected by the first channel selector.

5. The television receiver as claimed in claim 3, wherein said television receiver further comprises:

means for causing the second channel selector to stop cycling round those channels having favorite pages of data associated with them.

6. The television receiver as claimed in claim 5, wherein said television receiver further comprises:

means for causing the second channel selector to select a channel for display as a picture in a picture.

7. The television receiver as claimed in claim 5, wherein said television receiver further comprises:

means for causing the second channel selector to selected a channel for recording.

* * * * *